United States Patent [19]
Baqai et al.

[11] Patent Number: 5,675,271
[45] Date of Patent: Oct. 7, 1997

[54] EXTENDED CHIP SELECT RESET APPARATUS AND METHOD

[75] Inventors: Imran Baqai; Merle L. Miller, both of Austin, Tex.

[73] Assignee: Advanced Micro Devices, Inc., Sunnyvale, Calif.

[21] Appl. No.: 504,502

[22] Filed: Jul. 20, 1995

[51] Int. Cl.$^6$ ................................. H03K 17/22
[52] U.S. Cl. ................... 327/142; 327/299; 327/160; 377/107
[58] Field of Search ...................... 327/142, 143, 327/198, 291, 298, 299, 544, 31, 26, 227, 230, 144, 145, 151, 154, 160; 377/20, 83, 107, 55

[56] References Cited

U.S. PATENT DOCUMENTS

| | | | |
|---|---|---|---|
| 4,365,174 | 12/1982 | Kucharewski | 307/594 |
| 4,755,985 | 7/1988 | Jayapalan et al. | 370/58 |
| 4,857,760 | 8/1989 | Stuebing | 327/299 |
| 5,159,217 | 10/1992 | Mortensen et al. | 307/597 |
| 5,381,451 | 1/1995 | Matsukawa | 327/291 |
| 5,414,745 | 5/1995 | Lowe | 327/142 |
| 5,442,310 | 8/1995 | Bazes | 327/143 |
| 5,457,660 | 10/1995 | Ito | 365/228 |
| 5,534,805 | 7/1996 | Miyazaki et al. | 327/154 |
| 5,537,055 | 7/1996 | Smith et al. | 327/142 |
| 5,539,343 | 7/1996 | Yamashita et al. | 327/142 |

FOREIGN PATENT DOCUMENTS 0 211 675   8/1986   European Pat. Off. .

OTHER PUBLICATIONS

K. Nishimura et al., "Advanced Analog Subscriber Line Interface Circuit LSI" NEC Research and Devolpment, vol. 32, No. 4, Oct. 1991.

*Primary Examiner*—Timothy P. Callahan
*Assistant Examiner*—Eunja Shin
*Attorney, Agent, or Firm*—Foley & Lardner

[57] ABSTRACT

An extended chip select reset circuit to generate a reset signal for a device, such as a SLAC, using the chip select line. When the chip select line has been maintained in an active state for at least a predetermined amount of time corresponding to a plurality of data clocks, then a reset signal is generated in order to reset the device. The plurality of data clocks is more than a number of data clocks used to clock in a word of data to the device in a normal mode of operation.

16 Claims, 6 Drawing Sheets

EXTENDED CHIP SELECT RESET APPARATUS AND METHOD

BACKGROUND OF THE INVENTION

1. Field of the Invention

The invention relates to an apparatus for generating a reset signal for a device by applying a chip select pulse that is in an active state for at least a certain time duration. More particularly, the invention relates to an apparatus for generating a special reset signal for a subscriber line audio processing circuit (SLAC) without the need for a separate reset input by enabling a chip select signal that is in an active state for at least 16 data clocks in duration. An apparatus according to the invention further permits individual devices in a plurality of such devices to be reset individually.

2. Background of the Invention

FIG. 1 shows a subscriber line audio processing circuit (SLAC) 5 for providing audio control for telephonic communications. One input to the SLAC 5 is a MPIDCLK signal, which is a data clock input for shifting data into or out of a microprocessor interface of the SLAC 5. Also shown in FIG. 1 is a DI/O input, from which control data is serially written into and read out of the SLAC 5. The data clock signal MPIDCLK (and the data clock signal MPIDCLKF) determines the rate at which the data is either written into or read out of the SLAC 5. The DI/O pin is in a high impedance state except when data is being received by or transmitted from the SLAC 5 under control of the chip select CSL (active low) pin.

In a conventional device, such as a SLAC 5, a reset RESETL (active low) pin is coupled with an externally-generated reset signal in order to provide a reset capability to the device.

With the use of these two ways of resetting a device such as a SLAC 5, in configurations in which a plurality of devices are connected together in a series, or cascaded, arrangement, a reset signal connected to each of the reset pins of the series-connected devices will reset each of the devices at the same time. A line card circuit that includes, for example, eight chips in a series arrangement, will typically have the resets of all of these eight chips tied together.

It is desirable to have a way of resetting one or more of the cascaded devices independently of the other cascaded devices, in a manner that is both economical and inexpensive to configure. An advantage of providing a different reset method is the pin savings on the chip package which can be used to provide other functions.

SUMMARY OF THE INVENTION

According to the invention, there is an apparatus for generating a reset signal for a subscriber line audio processing circuit (SLAC). The apparatus includes a first input port for reading in a clock signal which includes a plurality of clock pulses, a second input port for reading in a chip select signal, and a third input port for reading in an externally-generated reset signal. The reset signal is generated when the chip select signal is active for at least the predetermined number of clock pulses. The predetermined number is set to be greater than the number of clock cycles needed to read in a digital command by the SLAC.

An apparatus according to the invention also includes a synchronization circuit for synchronizing the asynchronous chip select signal to the clock signal, and outputting a synchronous chip select signal as a result thereof. The apparatus further includes a data clock circuit for generating an internal data clock signal based on the state of the chip select signal and the clock signal. When the chip select signal is in the active state, the internal data clock signal corresponds to the clock input, and when the chip select signal is in the inactive state, the data clock signal corresponds to an inactive signal. The apparatus also includes a data clock counter circuit, which is configured to receive the internal data clock signal and the synchronous chip select signal, and to output a count signal when the number of pulses of the internal data clock signal is between a second and third predetermined number, and to output a data-count signal when the number of pulses of the internal data clock signal is at least the third predetermined number. The data-count signal is used to reset the SLAC.

According to the invention, there is also an apparatus for generating a reset signal for a device which receives n-bit digital commands. The apparatus receives a chip select signal and a clock signal which includes a plurality of clock pulses. The apparatus includes a first timing circuit for determining when the chip select signal is placed into an asserted state from an unasserted state. The apparatus also includes a counting circuit for counting a number of clock pulses of the clock signal for a time period when the chip select signal is in the asserted state. The apparatus further includes a second timing circuit for determining when the chip select signal is placed into the unasserted state from the asserted state. The apparatus also includes a reset generation circuit for outputting the reset signal to the device if the number of clock pulses counted by the counting circuit is greater than a predetermined value, wherein the predetermined value is greater than the number n.

According to the invention, there is a method for generating a reset signal for a device which receives n-bit digital commands. The device receives a chip select signal and a clock signal which includes a plurality of clock pulses. The method includes a step of determining when the chip select signal is placed into an asserted state from an unasserted state. The method also includes a step of counting a number of clock pulses of the clock signal for a time period when the chip select signal is in the asserted state. The method further includes a step of determining when the chip select signal is placed into the unasserted state from the asserted state. The method still further includes a step of outputting the reset signal to the device if the number of clock pulses counted by the counting circuit is greater than a predetermined value, wherein the predetermined value is greater than the number n.

BRIEF DESCRIPTION OF THE DRAWINGS

For a description of a method and apparatus according to the invention, reference is made to the following description and accompanying drawings, in which.

DETAILED DESCRIPTION OF THE PREFERRED EMBODIMENT

Figure 2:
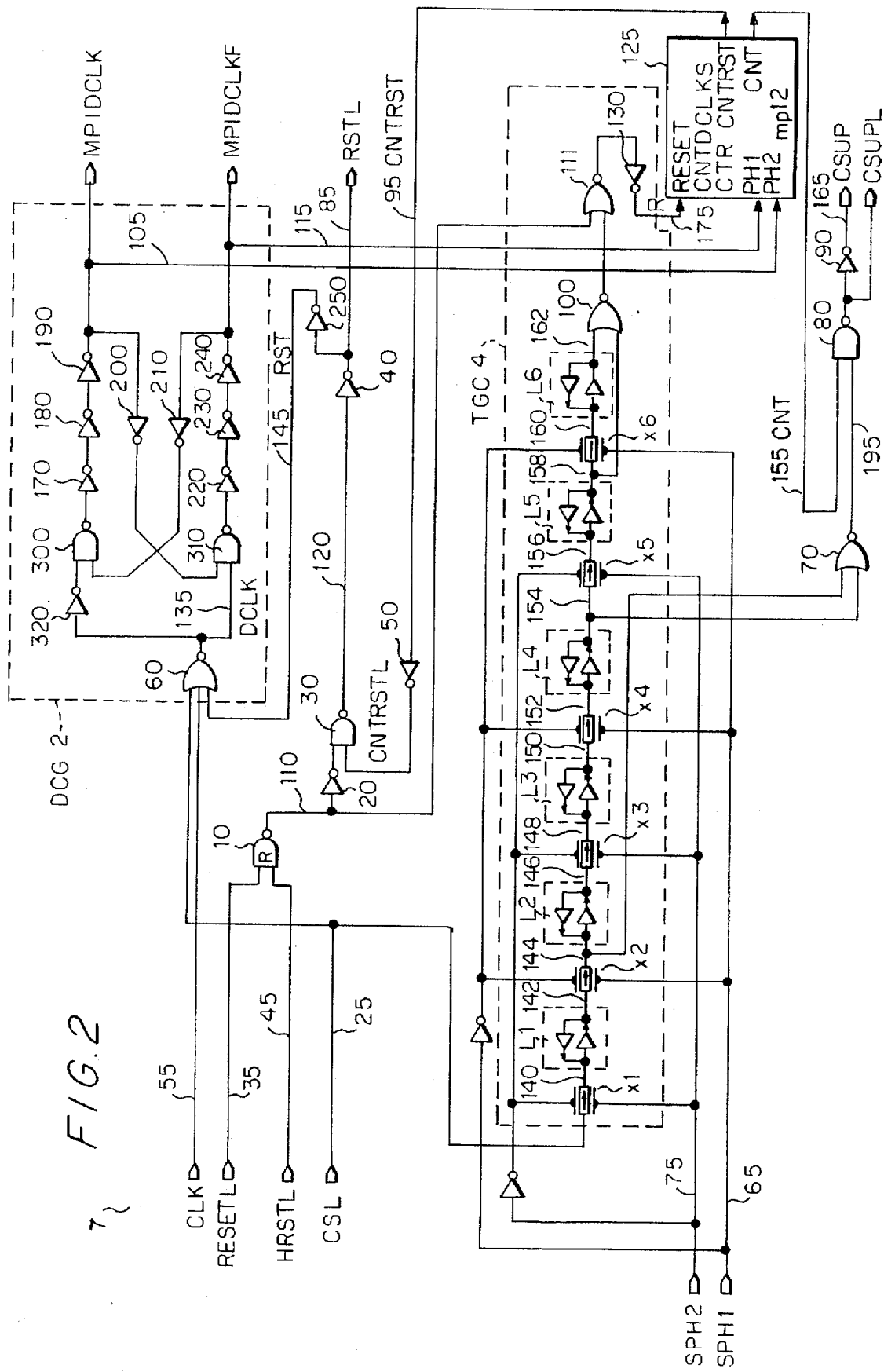
FIG. 2 is a block diagram of the reset signal generator circuit according to the invention.

FIG. 2 is a block diagram of the reset signal generator RSG circuit 7 according to the preferred embodiment of the invention. The RSG circuit 7 receives a chip select input CSL on line 25, which may be, for example, an active low signal. It will be known to those of ordinary skill in the art that the states of the active signal discussed herein are by way of example and that other active states may be selected as a matter of design choice without altering the scope of the invention.

The RSG circuit 7 also receives a reset signal RESETL on line 35, which also may be an active low signal. The RSG circuit 7 further receives a software-generated reset signal HRSTL on line 45, which also may be an active low signal. The RSG circuit 7 also has a clock input for receiving a clock signal CLK on line 55, and a phase 1 and phase 2 clock signal, SPH1 and SPH2, respectively, on lines 65 and 75. Using these input signals and with the circuitry as shown in FIG. 2, the RSG circuit 7 generates a reset signal RSTL on line 85 to reset a device connected to the RSG circuit 7, such as a SLAC, under certain conditions.

Figure 3:
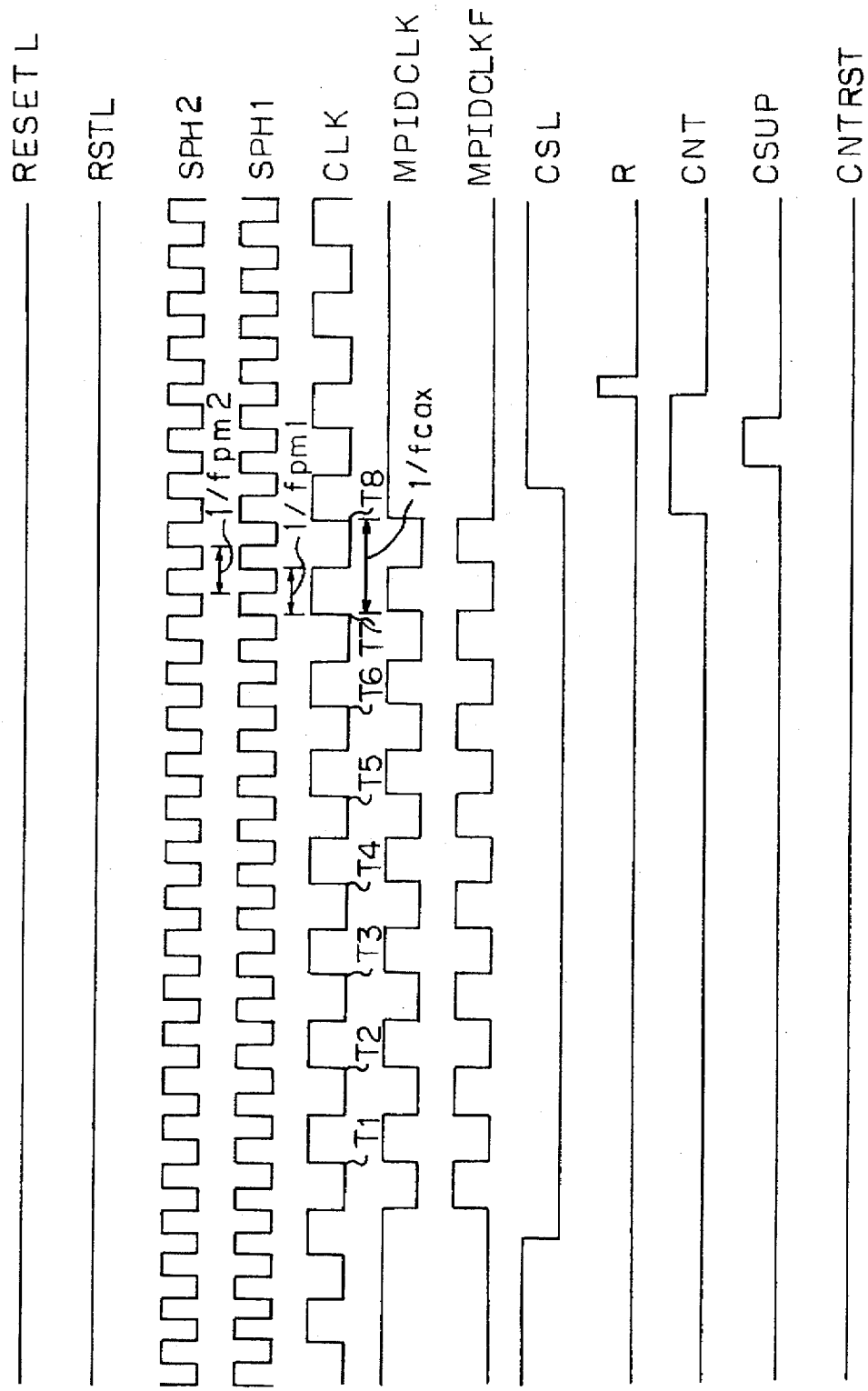
FIG. 3 is a timing diagram of a normal mode of operation of reading an eight-bit word into a device such as a SLAC.

Referring now to FIG. 3, the CLK signal is a 50% duty cycle signal that operates at a clock rate $f_{clk}$. The SPH1 signal is a 50% duty cycle signal that operates at a clock rate $f_{ph1}$ which is asynchronous with respect to the CLK signal. The SPH2 signal is a 50% duty cycle signal that operates at a clock rate $f_{ph2}=f_{ph1}$, and which is opposite in phase with respect to the SPH1 signal.

Referring back to FIG. 2, whenever either or both of the RESETL or HRSTL signals is in an active low state, the RSTL output on line 85 is forced into a low state, thereby resetting a device having its active low reset port connected to the RSTL output on line 85. This condition occurs because when either or both of the RESETL or HRSTL signals is in a low state (i.e., logic "0"), then the NAND Gate 10 outputs a logic high value (i.e., "1") on line 110. The logic high value on line 110 is input to an inverter 20, which outputs a logic low value to one input port of a NAND Gate 30. The logic low value that is input to one input port of NAND Gate 30 causes a logic high value to be output from the NAND Gate 30 on line 120 irrespective of the value of the CNTRSTL signal received on the second input port of NAND Gate 30. The logic high value on line 120 is fed through an inverter 40, which converts it to a logic low value on line 85, which corresponds to the output signal RSTL.

Alternatively, when both RESETL and HRSTL are in the inactive high state, NAND Gate 10 outputs a logic low value on line 110. That logic low value is inverted by inverter 20, which outputs a logic high value to the first input of NAND Gate 30. Under normal conditions, a count reset signal CNTRST according to the invention is in a low state (inactive). This means that the CNTRSTL signal at the output of inverter 50 is in a high state (inactive). The count reset signal CNTRST is used to generate the special reset signal according to the instant invention. The two high logic values input to the NAND Gate 30 cause a logic low value on the output of the NAND Gate 30, which is inverted by inverter 40 and resulting in a logical high RSTL signal being output on line 85.

Besides using either the RESETL or HRSTL signal in a conventional manner to provide a way of resetting a device connected to the RSG circuit 7, a third way of causing the RSTL output to be in an active low state is given by the RSG circuit 7 according to the invention. This third way of causing a reset occurs when the chip select signal CSL on line 25 is in an active low state for at least a predetermined number of clock periods, e.g., 16 clock periods. A counter circuit internal to the RSG circuit 7 determines this occurrence, and outputs the CNTRST signal on line 95.

The CNTRST signal causes the RSTL output to be placed in the active low state via appropriate logic circuitry as shown in FIG. 2, which in turn resets the device connected to the RSG circuit 7. That is, when the counter circuit CNTDCLKS 125 outputs a logic high value signifying the 16 clock periods as signal CNTRST on line 95, that signal is inverter by inverter 50, which outputs a logic low value as signal CNTRSTL to the second input port of NAND Gate 30. This results in the NAND Gate 30 outputting a logic high value on line 120 irrespective of the state of reset signals RESETL and HRSTL. That logic high value in turn is inverted by inverter 40, which results in a logic low value as the output signal RSTL on line 85.

Also shown in FIG. 2 is a dual-clock generation (DCG) circuit 2, which includes NOR Gate 60, NAND Gates 300, 310, and Inverters 320, 170, 180, 190, 200, 210, 220, 230 and 240. In the DCG circuit 2, two non-overlapping data clock signals MPIDCLK and MPIDCLKF are generated from the clock signal CLK and the chip select signal CSL. These out-of-phase data clock signals MPIDCLK and MPIDCLKF are respectively input to a PH1 and PH2 input (i.e., first and second phase clock inputs) of a data clock counter circuit CNTDCLKS 125. Based on these out-of-phase clock signals, the counter circuit CNTDCLKS 125 counts the number of data clock pulses, or DCLKS. A data clock pulse DCLK on line 135 is output whenever the clock signal CLK outputs a clock pulse (i.e. one clock pulse corresponds to a transition from a logic high state from a previous logic low state of the clock signal CLK), the chip select CSL signal is active (i.e., in a low state), and the reset signal RST on line 145 (which is the inverse of the RSTL output) is inactive (i.e., in a low state). The clock signal CLK outputs one clock pulse during one clock period defined by $1/f_{clk}$, as seen in FIG. 3.

Referring back to FIG. 2, when the chip select signal CSL on line 25 is in an inactive (high) state or when RST on line 145 is in an active high state, then no data clocks DCLK are generated on line 135, since the NOR Gate 60 outputs a logic low (i.e., "0") state during this time. Consequently, the counter circuit CNTDCLKS 125 does not count any clock pulses, since the respective PH1 and PH2 inputs of the counter circuit CNTDCLKS 125 always receive a signal having a same state, and thus no state transitions are counted. As is known to those of ordinary skill in the art, the determination of the number of data clock pulses can be made in any number of conventional ways, for example, by determining each low-to-high zero crossing of the data clock signal.

When the chip select signal CSL on line 25 is continuously in an active low state for a same time period when the reset output RSTL on line 85 is in an inactive high state, the counter circuit CNTDCLKS 125 starts counting the number of data clock pulses during that time period. When the count reaches eight, the CNT output on line 155 of the CNTDCLKS circuit 125 is placed into an active high state, and stays that way up to the count of 15. This causes a CSUP signal on line 165 to be placed into an active high state if a low-to-high transition of the chip select signal CSL occurs during this time. The CSUP signal operates to cause the device connected to the RSG circuit 7 to read and execute a command that has recently been clocked into the device.

During normal operation, the chip select signal is activated to the low state, and the 8-bit command is clocked into the device. Once the command has been read into the device, the chip select signal is deactivated to the high state. Soon afterward, the CSUP signal is generated by the RSG circuit 7 in order to notify the device that it can now decode and execute the read-in command. Also, a reset pulse R on line 175 is generated at the output of the inverter 130, via the transmission gate circuit TGC 4 soon after the chip select signal CSL was deactivated.

The reset pulse R on line 175 is connected to the reset pin RESET of the counter circuit CNTDCLKS 125. The reset pulse R operates to clear the count of the counter circuit CNTDCLKS 125 back to zero in order to set up the RGC circuit 7 to allow the device connected to the RGC circuit 7 to read a new 8-bit command word.

The TGC circuit 4 detects a low-to-high transition of the chip select signal CSL, which results in a logic high value output to both of the respective input ports of NOR Gate 70. This detection of a low-to-high transition of the chip select signal CSL causes a logic high value at the output of NOR Gate 70 on line 195 at a time approximately 1 CLK clock cycle after that low-to-high transition of the chip select signal CSL occurred. The logic high value of the NOR Gate 70 is input to one port of the NAND Gate 80, and the CNT signal on line 155 is received at the second port of the NAND Gate 80. Thus, when CNT is at a logic high value when NOR Gate 70 is outputting a logic high value, CSUP is output in a high state for about one clock cycle.

The operation of the TGC circuit 4 will now be explained in more detail. When the chip select signal CSL is in an inactive (high) state, transmission gate X1 will output a logic high state onto line 140 upon the occurrence of a rising edge of the SPH2 clock signal. The high state on line 140 will be fed through latch L1, which will output a logic low state onto line 142. The transmission gate X2 will then output a logic low state onto line 144 upon the occurrence of a rising edge of the SPH1 clock signal.

The low state on line 144 will be fed through latch L2, which will output a logic high state onto line 146. The transmission gate X3 will then output a logic high state onto line 148 upon the occurrence of a rising edge of the SPH2 clock signal.

The high state on line 148 will be fed through latch L3, which will output a logic low state onto line 150. The transmission gate X4 will then output a logic low state onto line 152 upon the occurrence of a rising edge of the SPH1 signal.

The low state on line 152 will be fed through latch L4, which will output a logic high state onto line 154. The transmission gate X5 will then output a logic high state onto line 156 upon the occurrence of a rising edge of the SPH2 signal.

The high state on line 156 will be fed through latch L5, which will output a logic low state onto line 158. The transmission gate X6 will then output a logic low state onto line 160 upon the occurrence of a rising edge of the SPH1 signal.

The low state on line 160 will be fed through latch L6, which will output a logic high state onto line 162, which connects to one input port of NOR Gate 100. The other input port of NOR Gate 100 is connected to line 158, and so when the chip select line CSL is in an inactive high state for a period of time (i.e., at least 2 clock cycles), line 158 is at a low state, and line 162 is at a high state. Thus, NOR Gate 100 outputs a logic low value to one input port of NOR Gate 111.

The other input port of NOR Gate 111 is connected to receive the reset indication on line 110 from NAND Gate 10, which is in a logic low state when both RESETL and HRSTL are inactive high. Thus, when RESETL and HRSTL are both inactive high and when the chip select signal CSL is in an inactive high state for a period of time, NOR Gate 111 outputs a logic high state. That logic high state is inverted by inverter 130, which outputs a logic low state on line 175 to the RESET input of the counter circuit CNTDCLKS 125.

NOR Gate 70 has one input port connected to line 144 and another input port connected to line 154. When the chip select signal CSL is in an inactive high state for a period of time, line 154 is in a high state and line 144 is in a low state. Thus, NOR Gate 70 outputs a logic low value on line 195 to one input port of NAND Gate 80. NAND Gate 80 outputs a logic high value, which is inverted by inverter 90, and so CSUP will be placed in an inactive low state.

When the chip select line CSL transitions from the inactive high state to the active low state, transmission gate X1 will receive the low state and will output a logic low state onto line 140 upon the occurrence of a rising edge of the SPH2 clock signal. The low state on line 140 will be fed through latch L1, which will output a logic high state onto line 142. The transmission gate X2 will then output a logic high state onto line 144 upon the occurrence of a rising edge of the SPH1 clock signal.

At this time, NOR Gate 70 receives a logic high state at both of its inputs, which does not change the output of NOR Gate 70 on line 195, nor does it change the (inactive low) state of CSUP.

The high state on line 144 will be fed through latch L2, which will output a logic low state onto line 146. The transmission gate X3 will then output a logic low state onto line 148 upon the occurrence of a rising edge of the SPH2 clock signal.

The low state on line 148 will be fed through latch L3, which will output a logic high state onto line 150. The transmission gate X4 will then output a logic high state onto line 152 upon the occurrence of a rising edge of the SPH1 signal.

The high state on line 152 will be fed through latch L4, which will output a logic low state onto line 154. The transmission gate X5 will then output a logic low state onto line 156 upon the occurrence of a rising edge of the SPH2 signal.

At this time, NOR Gate 70 receives a logic high state on line 144, a logic low state on line 154. This does not change the output of NOR Gate 70, nor does it change the (inactive low) state of CSUP.

The low state on line 156 will be fed through latch L5, which will output a logic high state onto line 158.

At this time, NOR Gate 100 receives a high state at both of its inputs. This does not change the output of NOR Gate 100, and the state of the reset pulse R on line 175 stays in an inactive low state as long as RESETL and HRSTL are also inactive high.

The transmission gate X6 outputs a logic high state onto line 160 upon the occurrence of a rising edge of the SPH1 signal.

The high state on line 160 is fed through latch L6, which outputs a logic low state onto line 162, which connects to one input port of NOR Gate 100. Thus, NOR Gate 100 receives a logic low state at one of its input ports via line 162 and a logic high state at the other of its input ports via line 158. As a result, NOR Gate 100 outputs a logic low value to one input port of NOR Gate 111. When RESETL and HRSTL are both inactive high, NOR Gate 111 outputs a logic high state, which is inverted by inverter 130, and which sends a logic low state as the reset pulse R on line 175 to the RESET input of the counter circuit CNTDCLKS 125.

Therefore, as the chip select signal CSL transitions from an inactive (high) state to an active (low) state, CSUP stays in an inactive (low) state, and the reset pulse R stays in the inactive (low) state (assuming RESETL and HRSTL are unasserted at that time).

When the chip select line CSL transitions from the active (low) state to the inactive (high) state, transmission gate X1 will receive the high state and will output a logic high state onto line 140 upon the occurrence of a rising edge of the SPH2 clock signal. The high state on line 140 will be fed through latch L1, which will output a logic low state onto line 142. The transmission gate X2 will then output a logic low state onto line 144 upon the occurrence of a rising edge of the SPH1 clock signal.

At this time, NOR Gate 70 receives a logic low state on both of its inputs. As a result, NOR Gate 70 outputs a logic high state to one input port of NAND Gate 80. If CNT is also in an active high state on line 155 during this time, NAND Gate 80 will output a logic low value, which is inverted by inverter 90 to a logic high value which represents CSUP.

The low state on line 144 will be fed through latch L2, which will output a logic high state onto line 146. The transmission gate X3 will then output a logic high state onto line 148 upon the occurrence of a rising edge of the SPH2 clock signal.

The high state on line 148 will be fed through latch L3, which will output a logic low state onto line 150. The transmission gate X4 will then output a logic low state onto line 152 upon the occurrence of a rising edge of the SPH1 signal.

The low state on line 152 will be fed through latch L4, which will output a logic high state onto line 154.

At this time, NOR Gate 70 receives a logic low value via line 144 and a logic high value via line 154. As a result, the output of NOR Gate 70 is set back to a low state approximately one CLK clock cycle (or 1 SPH1+1 SPH2 clock cycle) after the output of NOR Gate 70 was placed in the high state. By this configuration of the TSG circuit 4, CSUP is limited to be in an active (high) state for at most 1 CLK clock cycle for each low-to-high transition of the chip select signal CSL (and assuming the CNT signal was also active high).

The transmission gate X5 will then output a logic high state onto line 156 upon the occurrence of a rising edge of the SPH2 signal.

The high state on line 156 will be fed through latch L5, which will output a logic low state onto line 158.

At this time, NOR Gate 100 receives a logic low value on both of its input ports, resulting in a logic high value at the output of NOR Gate 100. This condition forces the output of NOR Gate 111 to a logic low state, which is inverted by inverter 130, to result in the reset pulse R on line 175 being set to an active high state.

The transmission gate X6 outputs a logic low state onto line 160 upon the occurrence of a rising edge of the SPH1 signal.

The low state on line 160 is fed through latch L6, which outputs a logic high state onto line 162, which connects to one input port of NOR Gate N2. Thus, NOR Gate 100 receives a logic low state at one of its input ports and a logic high state at the other of its input ports. As a consequence, NOR Gate 100 outputs a logic high value to one input port of NOR Gate 111. When RESETL and HRSTL are both inactive high, NOR Gate 111 outputs a logic high state, which is inverted by inverter 130. Inverter 130 outputs a logic low state as the reset pulse R on line 175 as the RESET input of the counter circuit CNTDCLKS 125. Thus, the reset pulse R is only active (high) for one SPH1 (or SPH2) clock cycle that occurs shortly after the low-to-high transition of the chip select signal CSL.

In the normal mode of operation according to the invention, the SLAC reads in an eight-bit word, and decodes and executes that word upon receiving the active high CSUP signal from the RSG circuit 7. The reading of the 8-bit word corresponds in time duration to eight clock pulses. Once the eight-bit word has been read into a register (not shown) internal to the SLAC and subsequently decoded, the counter circuit CNTDCLKS 125 of the RSG circuit 7 is then reset by the reset pulse R, so that the counter circuit CNTDCLKS 125 is ready to count data clocks for a new eight-bit word to be subsequently read in by the SLAC. Each eight-bit word may correspond, for example, to one of a series of 8-bit commands for the SLAC to read and execute.

FIG. 3 shows the timing diagram during the normal mode of operation, in which eight consecutive rising edges T1–T8 of the clock signal CLK occur for a period of time during which the chip select signal CSL is in an active (low) state. At the eighth clock pulse, CNT is activated (i.e., placed in a high state), the CSL signal transitions from a low to a high state. The CSUP pulse is generated soon thereafter. Shortly after the CSUP pulse is generated, a reset pulse R is generated by the TSG circuit 4 to clear the counter CNTDCLKS 125. This reset pulse R is required in order set up the RSG circuit 7 for the next 8-bit word to be read in by the device connected to the RSG circuit 7.

Figure 4:
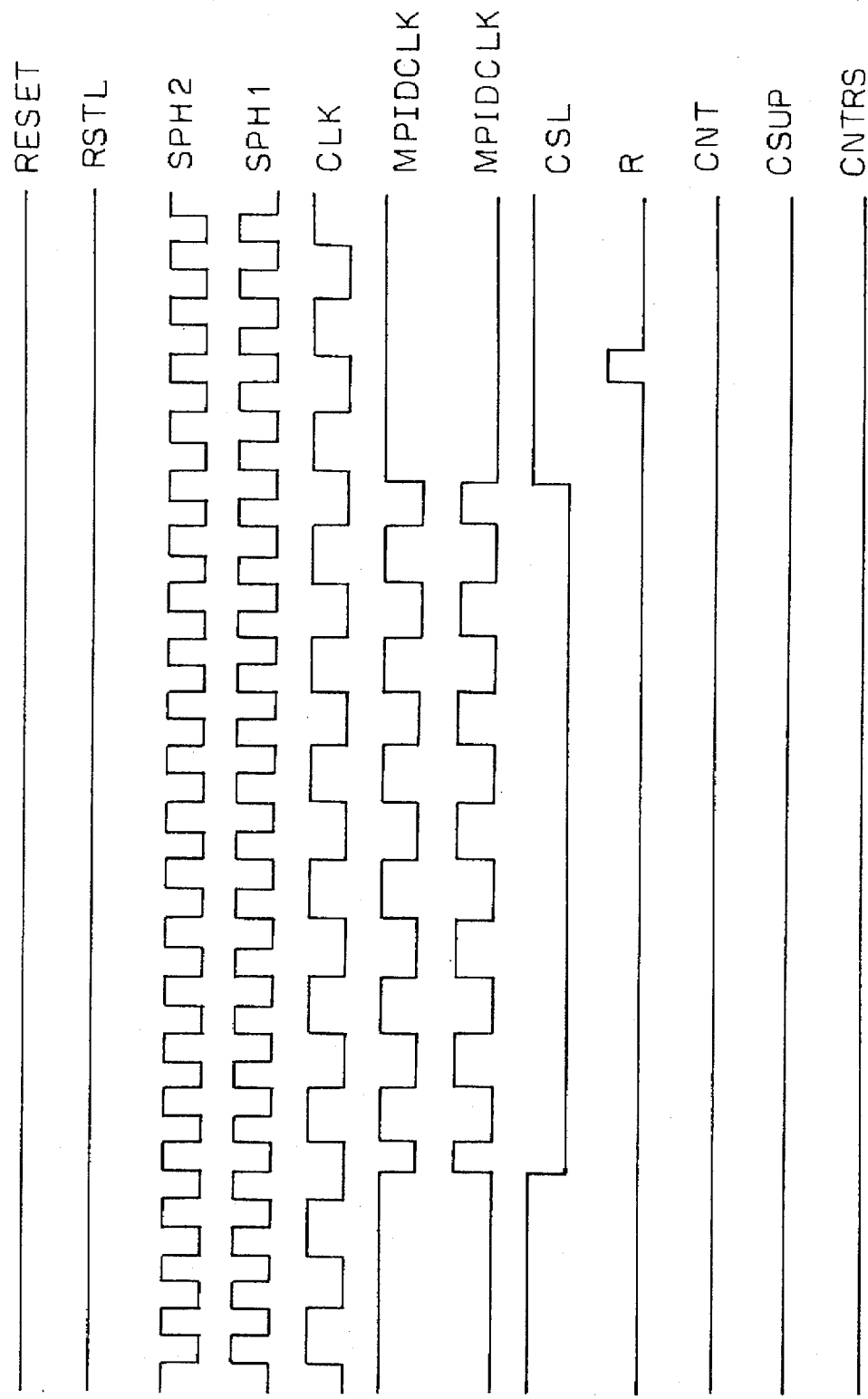
FIG. 4 is a timing diagram of a second mode of operation of reading less than eight bits of an eight-bit word into a device such as a SLAC.

In a second mode of operation according to the invention, the chip select signal CSL is in an active (low) state for less than eight clock rising edge transitions of the clock signal CLK. This second mode of operation is shown in FIG. 4, in which case the CNT output of the counter circuit CNTDCLKS 125 is never placed into an active (high) state, since the count of 8 is not reached. Since CNT stays in an inactive (low) state, the output CSUP is always maintained in an inactive (low) state. In the second mode of operation, after the CSL goes back to the inactive (high) state, the reset pulse R is generated soon thereafter in order to reset the counter circuit CNTDCLKS 125.

The second mode of operation according to the invention primarily corresponds to instances when a software glitch causes an inadvertent assertion of the CSL signal for a period of less than eight clock cycles. Since the CNT signal is not asserted due to the short-duration CSL "glitch", the CSUP signal is never generated, and the device is not triggered to read a non-existent command.

The second mode of operation may also occur when a first command is being clocked into the SLAC, and a higher priority command is received in the interim. At this point, the control circuitry (not shown) immediately places the CSL line into the inactive state in order to generate the reset pulse R to reset the count of the CNTDCLKS circuit 125. Then, the higher priority command can be immediately read into the SLAC via the normal mode of operation, as shown in FIG. 3, for example. The partially-read-in lower priority command is not executed by the SLAC, until perhaps after the higher-priority command has been read in and executed, at which time the lower priority command can be entirely read into the SLAC via the normal mode of operation.

As stated earlier, the reset pulse R is generated from a logic circuit which includes the series of transmission gates X1–X6, the NOR Gates 100, 111, and the inverter 130 of the TSG circuit 4, as well as the chip select signal CSL as shown in FIG. 2. The reset pulse R on line 175 can also be generated from the assertion of either of the reset signals RESETL and HRSTL. Whenever the chip select signal CSL signal goes into an inactive high state, the reset pulse R is generated soon thereafter as the low-to-high transition of the chip select signal CSL signal propagates through the TSG circuit 4. Also, if either or both of the reset signals RESETL and HRSTL is activated, the reset pulse R is immediately generated.

In the normal mode of operation according to the invention, the chip select signal CSL signal will be active only long enough to input eight bits of data (corresponding to a single command word) to the SLAC. In this case, the chip select signal CSL remains in an active (low) state for that period, as shown in FIG. 3. During that time, eight bits of serial data are input to a shift register (not shown). Once the data has been input, the chip select signal CSL is deasserted. CSUP is asserted due to the circuit CNTDCLKS counting eight data clocks while the chip select signal CSL was asserted, and the eight-bit data word is then decoded to determine a mode for the SLAC to be in or a command for the SLAC to execute.

Figure 5:
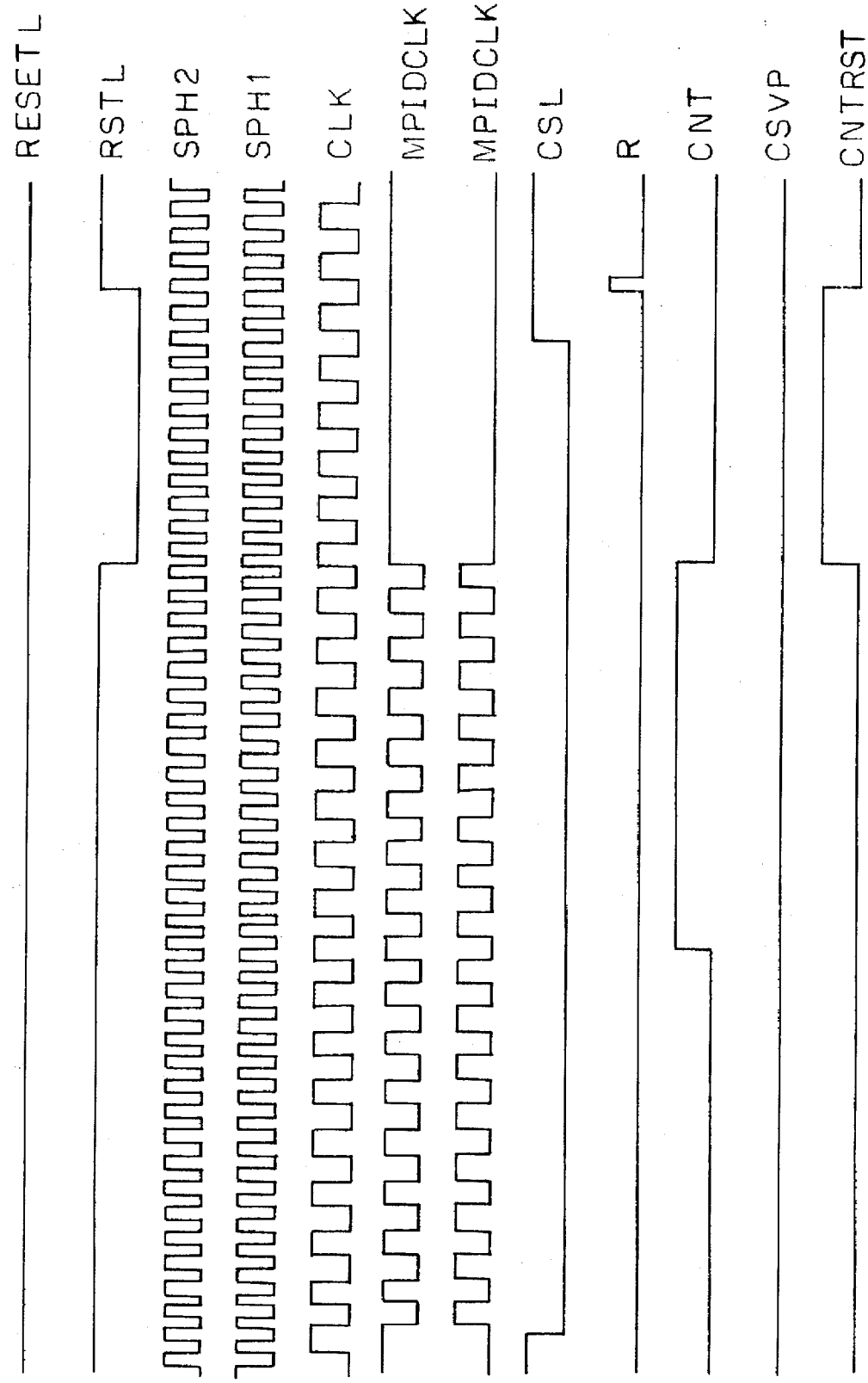
FIG. 5 is a timing diagram of a third mode of operation of having at least 16 consecutive data clock cycles in which the chip select line is in an active state, thereby causing a reset signal to be generated in the reset signal generator circuit according to the invention.

In a third mode of operation according to the invention, as shown in FIG. 5, the chip select signal CSL signal stays in an active low state for at least 16 clock cycles, which is longer than the eight clock cycles needed to read in an 8-bit command. Since data corresponding to the 8-bit command has already been read in by the SLAC not long after the eighth clock cycle counted from the time when the first bit of the 8-bit command was clocked into the device, the system according to the invention provides for the generation of a reset signal RSTL to the SLAC approximately eight clock cycles later. This method of resetting the SLAC is independent of all the other ways of resetting the SLAC (i.e., via reset pin RESETL or via software-generated reset command HRSTL). The choice of 16 data clocks during the assertion of the chip select signal CSL signal is made to be sufficiently far away from the normal mode of 8 data clocks during the assertion of the chip select signal CSL signal (see FIG. 3) so that inadvertent resets will seldom occur. Other numbers of data clocks could be selected, however.

Thus, according to the invention, if during the normal mode of operation the chip select signal CSL is held in an active (low) state for a few more than eight clock cycles, for example, 11 clock cycles, this condition will not result in an unwanted resetting of the SLAC by the RSG circuit 7.

The transmission gates X1–X6 of the TSG circuit 4 also operate to synchronize the chip select signal CSL with the two out-of-phase clock signals SPH1, SPH2. This synchronization is needed since the chip select signal CSL is asynchronous, and so the phase of CSL is unknown with respect to the phase of the internal clock signals SPH1, SPH2. The latches L1–L6 situated after each of the respective transmission gates X1–X6 are used to invert and hold data between transitions of the two-phase clock signals SPH1, SPH2.

Also shown in FIG. 2 is a NAND Gate 80, which receives as one input the CNT signal on line 155 and which receives on line 195 the output from the NOR Gate 70. The NOR Gate 70 receives signals on lines 144 and 154 at its respective two input ports.

When the count signal CNT on line 155 is in an inactive low state, the signal on line 195 is prevented from being passed through to the output of the NAND Gate 80. The CNT signal on line 155 is placed in an active state for a time corresponding to the eighth through fifteenth consecutive clock pulses from when the chip select signal CSL was asserted from a previously deasserted state.

Once the chip select signal CSL is deasserted at a later time, the signal on line 195 is fed through the NAND Gate 80 to be output as the CSUP signal. The signal on line 195 is placed in a logic high state for about one clock cycle shortly after a low-to-high transition of the chip select signal CSL.

Figure 1:
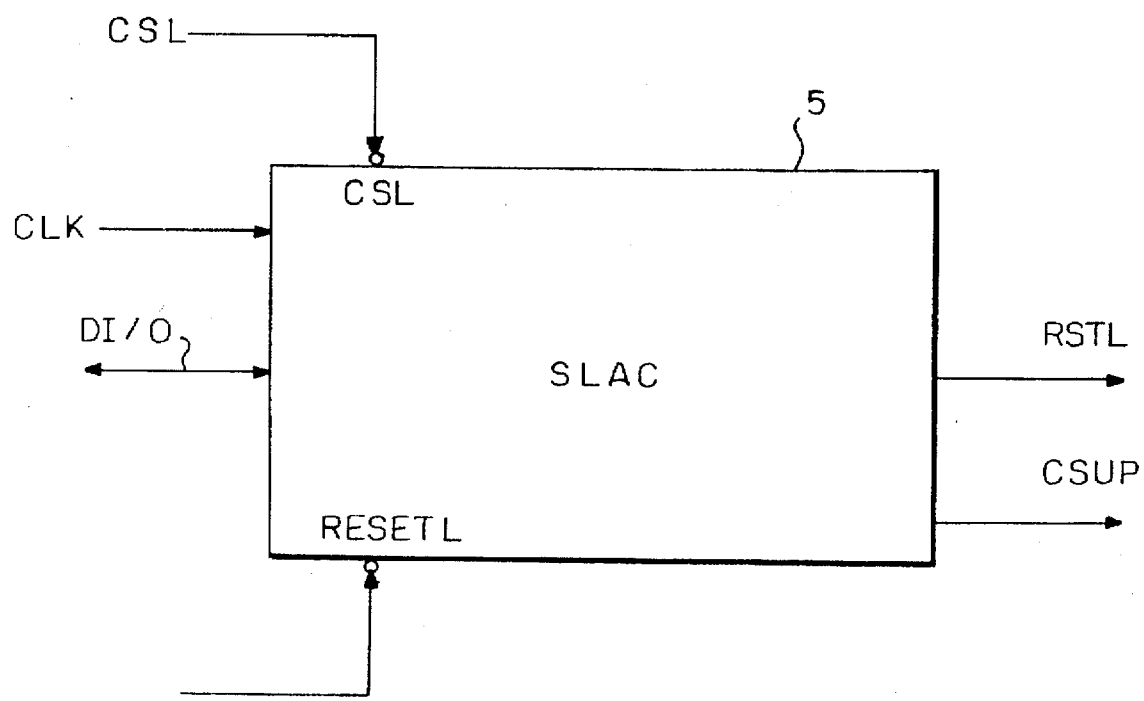
FIG. 1 is a block diagram of the input and output pins of a SLAC that can be used with the reset signal generator circuit according to the invention.

Referring now to FIG. 1, the CSUP signal is received by the device connected to the RSG circuit 7, and interpreted by the device as an enable signal to read and evaluate a command previously read into the device. For example, the CSUP signal can be used to enable the execution of an eight-bit word read into the shift register of the device. If the CSUP signal is not activated, then a command read into the device is not executed.

Referring now to both FIG. 2 and FIG. 5, when the CNTRST signal on line 95 goes into the active high state after 16 consecutive clock cycles while the chip select signal CSL is maintained in a low state and while the reset signal RESETL and HRSTL are not asserted, a reset signal CNTRST is set to a high state. The reset signal CNTRST activates the RSTL output, which in turn resets the device having its RESET input connected to the RSTL output. Since the chip select signal CSL has not transitioned from the low-to-high state during the 8th through 15th clocks in which the CNT signal is activated, the CSUP signal stays deasserted.

If the chip select signal CSL stays in an active low state even after the 16th clock (i.e., 17th clock, 18th clock, etc.), the reset signal CNTRST stays in an active high state, thereby maintaining the external reset line RSTL in an active low state. Once the chip select signal CSL transitions from a low to a high state, the TSG circuit 4 forces the reset pulse R to a high state soon thereafter. This causes a resetting of the count of the counter circuit CNTDCLKS 125, which deactivates the CNTRST signal.

Figure 6:
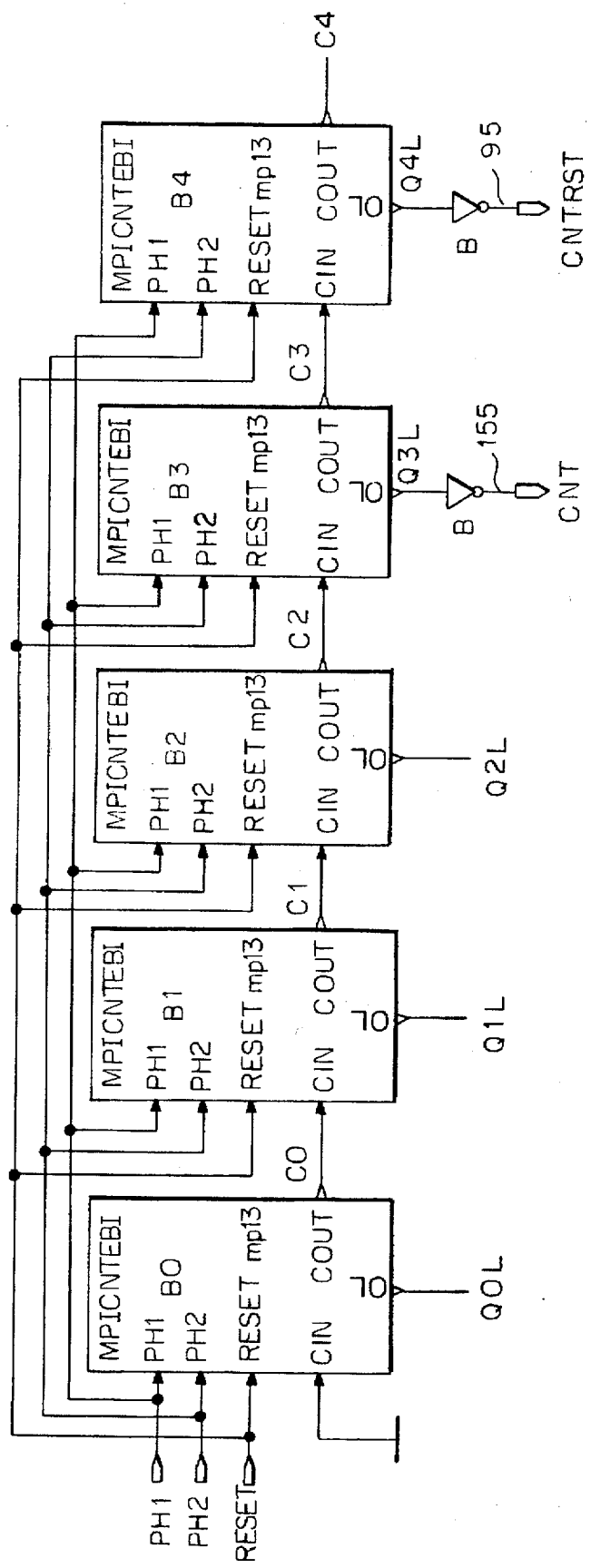
FIG. 6 is a diagram of a data clock counter circuit that can be used in the reset signal generator circuit according to the invention.

The choice of resetting after 16 clock cycles while the chip select signal CSL is maintained was made to simplify the RSG circuit 7. For example, by using the circuit as shown in FIG. 6 as the counter circuit CNTDCLKS 125, the most significant bit (MSB) line of the 5-bit counter is all that is needed to generate the CNTRST signal. The next-to-MSB line is used to output the CNT signal that causes the assertion of the CSUP signal at the correct time; that is, between the counts of 01000 and 01111, inclusive.

Of course, those of ordinary skill in the art will appreciate that any number of data clock counts may be used to generate this third type of reset, such as using the MSB and the next-to-MSB of an n-bit counter CNTDCLKS, such that when the count reaches a value equal to $2^{n-1}+2^{n-2}$, the reset signal RSTL will be activated.

Also, if the number of bits corresponding to a single digital command word is different, say for example, 16-bit words, those of ordinary skill in the art will recognize that the CNTDCLKS circuit 125 can be modified to handle this situation as well. For a 16-bit command word, a six-bit counter can be used to output the CNT signal using the next-to-MSB line (i.e., $2^4=16$), and the CNTRST signal using the MSB line (i.e., $2^5=32$).

As long as the chip select signal CSL is in an inactive (high) state, the circuit CNTDCLKS 125 will not count any data clock DCLK pulses, since the NAND Gate 30 will not output any pulses during this time. Once the chip select signal CSL is placed into an active (low) state, the counter circuit CNTDCLKS 125 will have been reset by the reset pulse R on line 175 prior to that time. The counter circuit CNTDCLKS 125 will then begin to count the number of data clocks from the beginning of the assertion of the chip select signal CSL signal going into the active low state. Once 16 data clocks have been counted while the chip select signal CSL is maintained in the active (low) state, the CNTRST signal will be generated, thereby resetting the device connected to the RSG circuit 7.

The resetting after 16 data clocks is sufficiently far away in time from the eight-clock time needed to read in a single command word during a normal operation mode so that the generated reset will not interfere with the normal operation of the SLAC. Therefore, an operator can generate a reset for the SLAC just be asserting the chip select signal CSL in an active low state for a duration corresponding to at least 16 clock cycles. This results in a chip select "pulse" that is 16 clock-cycles wide.

Of course, the circuit can be designed to allow for the chip select signal CSL to be any particular width in order to cause a reset of the device, such as for at least 32 consecutive clock cycles. This forced reset is not a problem as mentioned earlier, since the data has already been read into the SLAC after the eighth clock cycle, and so resetting the SLAC eight clock cycles later will not adversely affect operation of telephone communication using the SLAC.

Essentially, the system according to the invention allows a user to apply a hardware reset to a device without requiring a reset pin for receiving an externally-generated reset signal. Even with a reset pin, a user typically has all of the reset pins of a plurality cascaded devices tied together, making it impossible to selectively reset one or more of the cascaded devices using the external reset pin. However, the chip select pins for these cascaded devices are normally separate from each other, so that the chip select pins can be used to receive a chip select long-duration signal in a manner described above to reset particular ones of these devices easily.

While a preferred embodiment of the invention has been described herein, modification of the described embodiment may become apparent to those of ordinary skill in the art, following the teachings of the invention, without departing from the scope of the invention as set forth in the appended claims. For example, although the description given above was for active low chip select and reset signals, the invention would work equally as well with active high signals.

What is claimed is:

1. An apparatus for generating a reset signal for a subscriber line audio processing circuit (SLAC), comprising:

a first input port for reading in a clock signal including a plurality of clock pulses;

a second input port for reading in a chip select signal, the chip select signal being in one of an active state and an inactive state;

a reset circuit, said reset circuit generating the reset signal when the chip select signal is in the active state for at least a predetermined number of the plurality of clock pulses, wherein the predetermined number of clock pulses is greater than a number of clock pulses needed to read in a digital command by the SLAC; and a third input port for reading in an externally-generated reset signal, the externally-generated reset signal being in one of an active state and an inactive state, the reset signal also being generated when the externally-generated reset signal is placed in the active state.

2. An apparatus as claimed in claim 1, wherein the predetermined number of clock pulses is 16.

3. An apparatus as claimed in claim 1, wherein the number of clock pulses needed to read in a digital command by the SLAC is eight.

4. An apparatus as claimed in claim 1, wherein the reset circuit further comprises:

a synchronization circuit receiving the chip select signal and the clock signal, the synchronization circuit synchronizing the chip select signal to the clock signal, and outputting a synchronous chip select signal as a result thereof;

a data clock circuit, the data clock circuit generating a data clock signal based on the chip select signal, the clock signal and the externally-generated reset signal, the data clock signal corresponding to the clock signal when the chip select signal is in the active state and the externally-generated reset signal is in the inactive state, the data clock signal corresponding to an inactive signal when either or both of the chip select signal is in the inactive state and the externally-generated reset signal is in the active state; and a data clock counter circuit coupled to the data clock circuit and the synchronization circuit, the data clock counter circuit being configured to receive the data clock signal and the synchronous chip select signal, and to output a count signal when the number of pulses of the data clock signal is between a second and third predetermined number, and to output a data count signal when the number of pulses of the data clock signal is at least the third predetermined number, the data count signal being used to reset the SLAC.

5. An apparatus as claimed in claim 4, wherein the second predetermined number of clock pulses is eight, and the third predetermined number of clock pulses is sixteen.

6. An apparatus as claimed in claim 1, wherein the inactive state of both the chip select signal and the externally-generated reset signal is a logic high value.

7. An apparatus as claimed in claim 1, wherein the inactive state of both the chip select signal and the externally-generated reset signal is a logic low value.

8. An apparatus for generating a reset signal for a device which receives n-bit digital commands, said apparatus receiving a chip select signal and a clock signal which includes a plurality of clock pulses, said apparatus comprising:

a timing circuit, the timing circuit determining when the chip select signal is placed into an asserted state from an unasserted state and outputting a first signal as a result thereof, the timing circuit determining when the chip select signal is placed into the unasserted state from the asserted state and outputting a second signal as a result thereof;

a counting circuit, counting a number of clock pulses of the clock signal for a time period between receipt of the first signal from the timing circuit and receipt of the second signal from the timing circuit; and a reset generation circuit, the reset generating circuit generating the reset signal and outputting the reset signal to the device if the number of clock pulses counted by the counting circuit exceeds a predetermined value, the predetermined value being greater than the number n.

9. An apparatus for generating a reset signal for a device which receives n-bit digital commands, said apparatus receiving a chip select signal and a clock signal which includes a plurality of clock pulses, said apparatus comprising:

- a timing circuit, the timing circuit determining when the chip select signal is placed into an asserted state from an unasserted state and outputting a first signal as a result thereof, the timing circuit determining when the chip select signal is placed into the unasserted state from the asserted state and outputting a second signal as a result thereof;
- a counting circuit, the counting circuit being connected to the timing circuit, the counting circuit counting a number of clock pulses of the clock signal for a time period between receipt of the first signal from the timing circuit and receipt of the second signal from the timing circuit; and
- a reset generation circuit, the reset generation circuit being connected to the counting circuit, the reset generation circuit generating the reset signal and outputting the reset signal to the device if the number of clock pulses counted by the counting circuit exceeds a predetermined value, the predetermined value being greater than the number n, said apparatus further receiving an externally-generated reset signal in one of an active state and an inactive state, and the reset signal also being generated when the externally-generated reset signal is placed into the active state.

10. An apparatus as claimed in claim 9, wherein the predetermined value is sixteen.

11. An apparatus as claimed in claim 9, wherein the number is eight.

12. An apparatus as claimed in claim 9, wherein the asserted state is an active low state.

13. An apparatus as claimed in claim 9, wherein the asserted state is an active high state.

14. A method for generating a reset signal for a device which receives n-bit digital commands, said device receiving a chip select signal and a clock signal which includes a plurality of clock pulses, the method comprising the steps of:

a) determining when the chip select signal is placed into an unasserted state from an asserted state and outputting a first signal as a result thereof;

b) determining when the chip select signal is placed into the asserted state from the unasserted state and outputting a second signal as a result thereof;

c) counting a number of clock pulses of the clock signal for a time period between outputting the first signal and outputting the second signal;

d) outputting the reset signal to the device if the number of clock pulses counted during the counting step c) is greater than a predetermined value, wherein the predetermined value is greater than the number n;

e) receiving an externally generated reset signal which can be in one of a first state and a second state, said first state being indicative of a reset condition for said device; and f) outputting the reset signal to the device when the externally generated reset signal is in the first state.

15. A method as claimed in claim 14, wherein the predetermined value is sixteen.

16. A method as claimed in claim 14, wherein the number n is eight.

* * * * *